(12) United States Patent
MacKay (10) Patent No.: US 9,038,158 B1
(45) Date of Patent: May 19, 2015

(54) SYSTEMS AND METHODS FOR ENFORCING GEOLOCATION-BASED POLICIES

(75) Inventor: Paul MacKay, Provo, UT (US)

(73) Assignee: Symantec Corporation, Mountain View, CA (US)

( * ) Notice: Subject to any disclaimer, the term of this patent is extended or adjusted under 35 U.S.C. 154(b) by 300 days.

(21) Appl. No.: 13/178,225

(22) Filed: Jul. 7, 2011

(51) Int. Cl.
*G06F 7/04* (2006.01)
*G06F 15/16* (2006.01)
*G06F 17/30* (2006.01)
*H04L 29/06* (2006.01)
*H04L 9/32* (2006.01)

(52) U.S. Cl.
CPC ............ *H04L 9/3263* (2013.01); *H04L 63/107* (2013.01)

(58) Field of Classification Search
CPC . H04L 63/0823; H04L 63/107; H04L 9/3263; H04L 9/3247; G06F 21/33
USPC .......... 726/1–4, 16, 17, 26–29; 713/150, 155, 713/156; 709/203, 225, 226
See application file for complete search history.

(56) References Cited

U.S. PATENT DOCUMENTS

| 6,370,629 | B1 * | 4/2002 | Hastings et al. ............... 711/163 |
| 6,377,810 | B1 * | 4/2002 | Geiger et al. ............... 455/456.2 |
| 6,907,243 | B1 * | 6/2005 | Patel ............................ 455/442 |
| 7,092,943 | B2 * | 8/2006 | Roese et al. ........................... 1/1 |
| 7,565,685 | B2   | 7/2009 | Ross et al. |
| 7,657,747 | B2 * | 2/2010 | Ozog et al. ..................... 713/170 |
| 2003/0033528 | A1 * | 2/2003 | Ozog et al. ..................... 713/170 |
| 2003/0140246 | A1 * | 7/2003 | Kammer et al. ............... 713/201 |
| 2004/0103202 | A1 * | 5/2004 | Hildebrand et al. .......... 709/229 |
| 2008/0182592 | A1 * | 7/2008 | Cha et al. ................... 455/456.3 |
| 2009/0124207 | A1 * | 5/2009 | Mody et al. ................. 455/67.11 |
| 2009/0252102 | A1 * | 10/2009 | Seidel et al. ................... 370/329 |
| 2012/0159156 | A1 * | 6/2012 | Barham et al. ................ 713/156 |
| 2012/0331527 | A1 * | 12/2012 | Walters et al. ..................... 726/4 |

OTHER PUBLICATIONS

Pathak, Vivek; Robust Decentralized Authentication for Public Keys and Geographic Location; University of New Jersey; Jan. 2009.

* cited by examiner

*Primary Examiner* — Tae Kim
(74) *Attorney, Agent, or Firm* — ALG Intellectual Property, LLC (57) ABSTRACT

A computer-implemented method for enforcing geolocation-based policies may include (1) identifying a request from a computing system to access a computing resource, (2) identifying a public key certificate associated with the computing resource, the public key certificate including location data that indicates where the computing resource may be accessed from, (3) determining a current location of the computing system, (4) determining that the location data within the public key certificate indicates that the computing resource may be accessed from the current location of the computing system, and (5) allowing access to the computing resource based on the determination that the computing resource may be accessed from the current location of the computing system. Various other methods, systems, and computer-readable media are also disclosed.

20 Claims, 6 Drawing Sheets

SYSTEMS AND METHODS FOR ENFORCING GEOLOCATION-BASED POLICIES

BACKGROUND

In the electronic information age, individuals and organizations may quickly and easily share, access, and disseminate high volumes of information. For many individuals and organizations, the ease with which information may be disseminated electronically is empowering. However, the ubiquity of high-speed Internet access and smart mobile devices may pose unique challenges for individuals and organizations concerned with preventing the loss and/or exposure of sensitive data. Individuals and organizations are therefore increasingly looking for solutions to control access to sensitive data and other computing resources.

One technique for controlling access to sensitive data and other computing resources may involve the use of geolocation-based policies. Geolocation-based policies typically regulate a computing device's right to access data or computing resources based on the current location of the device. For example, a geolocation-based policy may specify that a mobile computing device may only access specific data or computing resources when the computing device is located within specific permissible locations, such as an organization's physical offices.

Unfortunately, the utility of geolocation-based policies may be undermined if these policies are impermissibly tampered with. For example, a user may attempt to circumvent various location-based restrictions associated with a computing resource by impermissibly adding the user's current location to a list of permissible locations contained within a geolocation-based policy associated with the computing resource. Accordingly, the instant disclosure identifies a need for additional and improved systems and methods for enforcing geolocation-based policies.

SUMMARY

As will be described in greater detail below, the instant disclosure generally relates to systems and methods for enforcing geolocation-based policies based on permissible location information stored in and extracted from public key certificates. In one example, a computer-implemented method for enforcing geolocation-based policies in such a manner may include (1) identifying a request from a computing system to access a computing resource, (2) identifying a public key certificate associated with the computing resource that includes location data that indicates where the computing resource may be accessed from, (3) determining a current location of the computing system, (4) determining that the location data within the public key certificate indicates that the computing resource may be accessed from the current location of the computing resource, and (5) allowing access to the computing resource based on the determination that the computing resource may be accessed from the current location of the computing resource.

In one example, the public key certificate may also include temporal data that indicates when the computing resource may be accessed. In such an example, the method may also include (1) determining the current time and then (2) determining that the temporal data within the public key certificate indicates that the computing resource may be accessed at the current time. In this example, access to the computing resource may also be allowed based on the determination that the temporal data indicates that the computing resource may be accessed at the current time. In other examples, access to the computing resource may also be allowed based on a content type specified in the request.

In some embodiments, the location data within the public key certificate may specify a plurality of locations from which the computing resource may be accessed. The location data within the public key certificate may also specify differentiated levels of access for the plurality of locations from which the computing resource may be accessed. In this example, allowing access to the computing resource may include allowing access to the computing resource in accordance with the level of access associated with the current location of the computing device.

In one example, the location data within the public key certificate may include three-dimensional location data. In this example, identifying the current location of the computing system may include identifying a three-dimensional location of the computing system.

The systems and methods described herein may identify the public key certificate in any suitable context. In some examples, identifying the public key certificate associated with the computing resource may include identifying a public key certificate created to regulate access to the computing resource. Identifying the public key certificate may also include verifying the integrity of the public key certificate to ensure that the location data within the public key certificate is valid. In addition, in at least one example the computing system may represent a mobile computing device.

In one embodiment, a system for implementing the above-described method may include one or more processors configured to execute an identification module, a location module, a determination module, and an allowance module. The identification module may be programmed to (1) identify a request from a computing system to access a computing resource and (2) identify a public key certificate associated with the computing resource that includes location data that indicates where the computing resource may be accessed from. The location module may be programmed to determine the current location of the computing system. The determination module may be programmed to determine that the location data within the public key certificate indicates that the computing resource may be accessed from the current location of the computing system. The allowance module may be programmed to allow access to the computing resource based on the determination that the computing resource may be accessed from the current location of the computing system.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a request from a computing system to access a computing resource, (2) identify a public key certificate associated with the computing resource that includes location data that indicates where the computing resource may be accessed from, (3) determine the current location of the computing system, (4) determine that the location data within the public key certificate indicates that the computing resource may be accessed from the current location of the computing system, and (5) allow access to the computing resource based on the determination that the computing resource may be accessed from the current location of the computing system.

As will be explained in greater detail below, by using location data embedded within public key certificates to enforce geolocation-based policies, the systems and methods described herein may control access to data or other computing resources (e.g., from mobile devices), while reducing the potential for tampering and/or circumvention of such geolocation-based policies. In addition, by verifying the integrity of such public key certificates, the systems and methods described herein may ensure that the location data contained within these public key certificates is valid and has not been tampered with.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
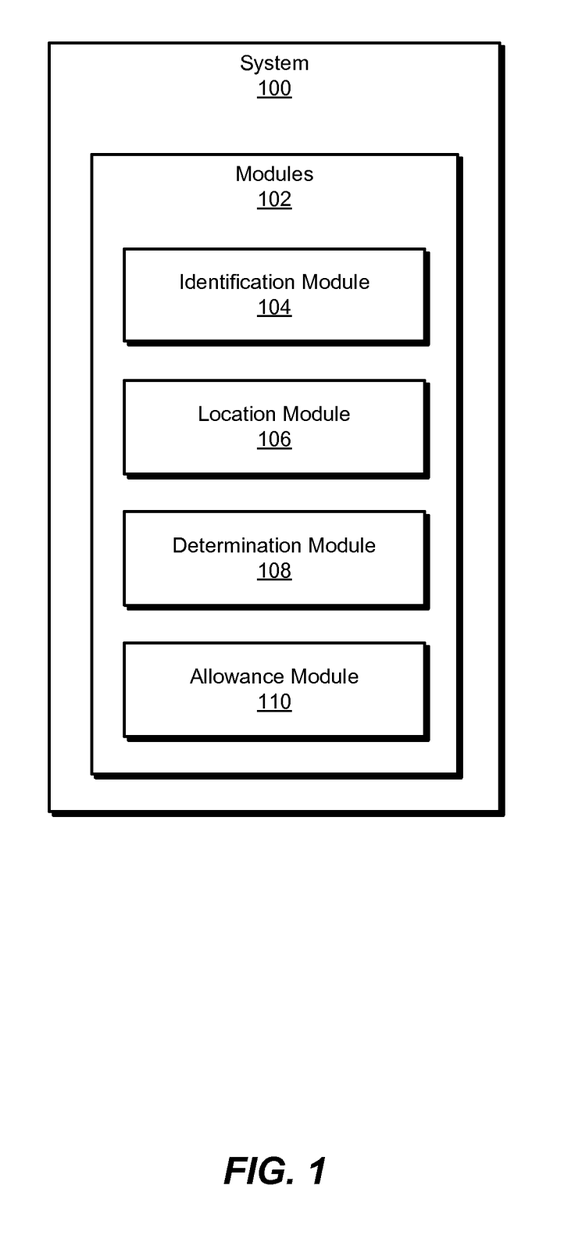
FIG. 1 is a block diagram of an exemplary system for enforcing geolocation-based policies.
Figure 2:
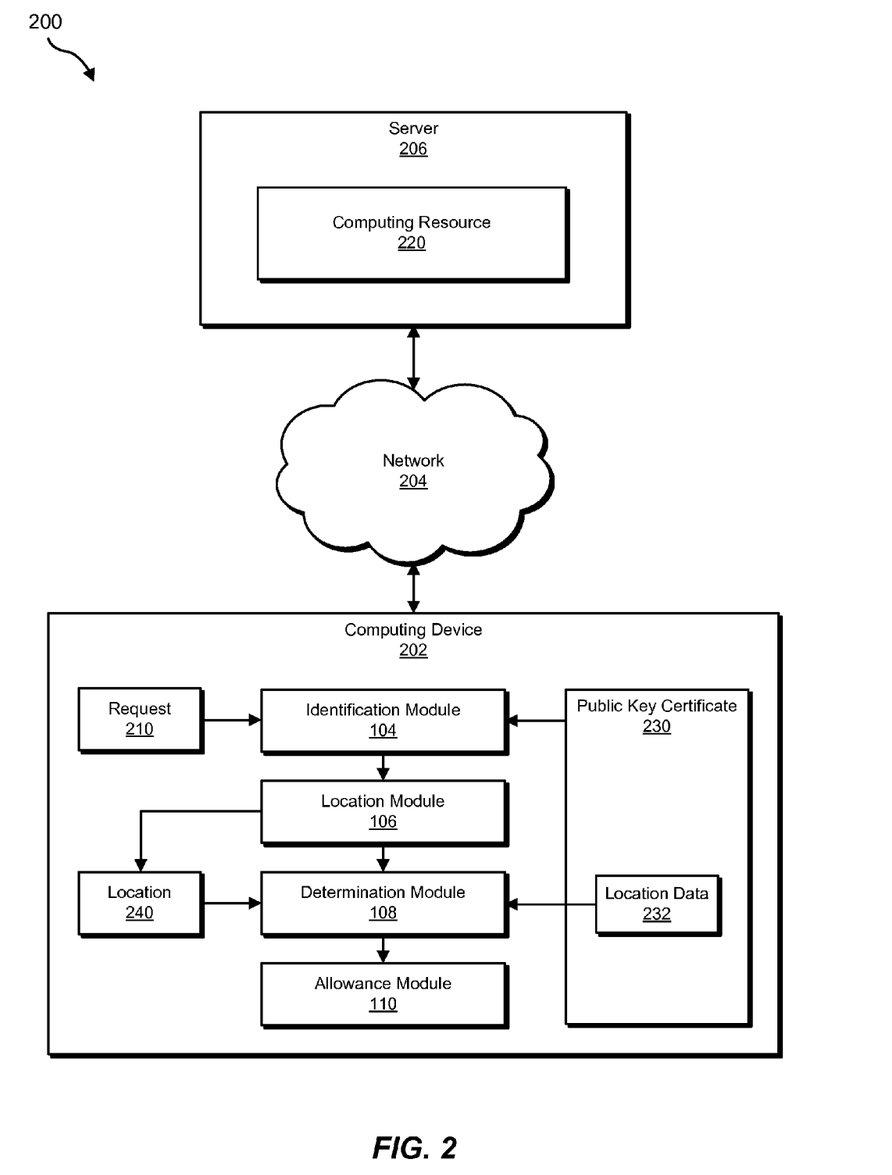
FIG. 2 is a block diagram of an exemplary system for enforcing geolocation-based policies.

The following will provide, with reference to FIGS. 1-2, detailed descriptions of exemplary systems for enforcing geolocation-based policies. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for enforcing geolocation-based policies. As illustrated in this figure, exemplary system 100 may include one or more modules 102 for performing one or more tasks. For example, and as will be explained in greater detail below, exemplary system 100 may include an identification module 104 programmed to (1) identify a request from a computing system to access a computing resource and (2) identify a public key certificate associated with the computing resource that includes location data that indicates where the computing resource may be accessed from. Exemplary system 100 may also include a location module 106 programmed to determine the current location of the computing system.

In addition, and as will be described in greater detail below, exemplary system 100 may include a determination module 108 programmed to determine that the location data indicates that the computing resource may be accessed from the current location of the computing device. Exemplary system 100 may also an allowance module 110 programmed to allow access to the computing resource based on the determination that the computing resource may be accessed from the current location of the computing device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, facilitate computing device 202 in enforcing geolocation-based policies. For example, and as will be described in greater detail below, one or more of modules 102 may cause computing device 202 to (1) identify a request (e.g., a request 210) from a computing system (e.g., computing device 202) to access a computing resource (e.g., computing resource 220), (2) identify a public key certificate (e.g., a public key certificate 230) associated with the computing resource that includes location data that indicates where the computing resource may be accessed from (e.g., location data 232), (3) determine the current location of the computing system (e.g., a location 240), (4) determine that the location data indicates that the computing resource may be accessed from the current location of the computing device, and (5) allow access to the computing resource based on the determination that the computing resource may be accessed from the current location of the computing device.

Computing device 202 generally represents any type or form of computing device capable of reading computer-executable instructions. Examples of computing device 202 include, without limitation, laptops, cellular phones, personal digital assistants (PDAs), desktops, servers, multimedia players, embedded systems, combinations of one or more of the same, exemplary computing system 510 in FIG. 5, or any other suitable computing device.

Server 206 generally represents any type or form of computing device that is capable of responding to requests for computing resources (e.g., data, services, etc.). Examples of server 206 include, without limitation, application servers and database servers configured to provide various database services and/or run certain software applications. In one example, server 206 may host and/or control access to computing resource 220, which may, as detailed below, represent various data, devices or other physical assets, services, and/or processes.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
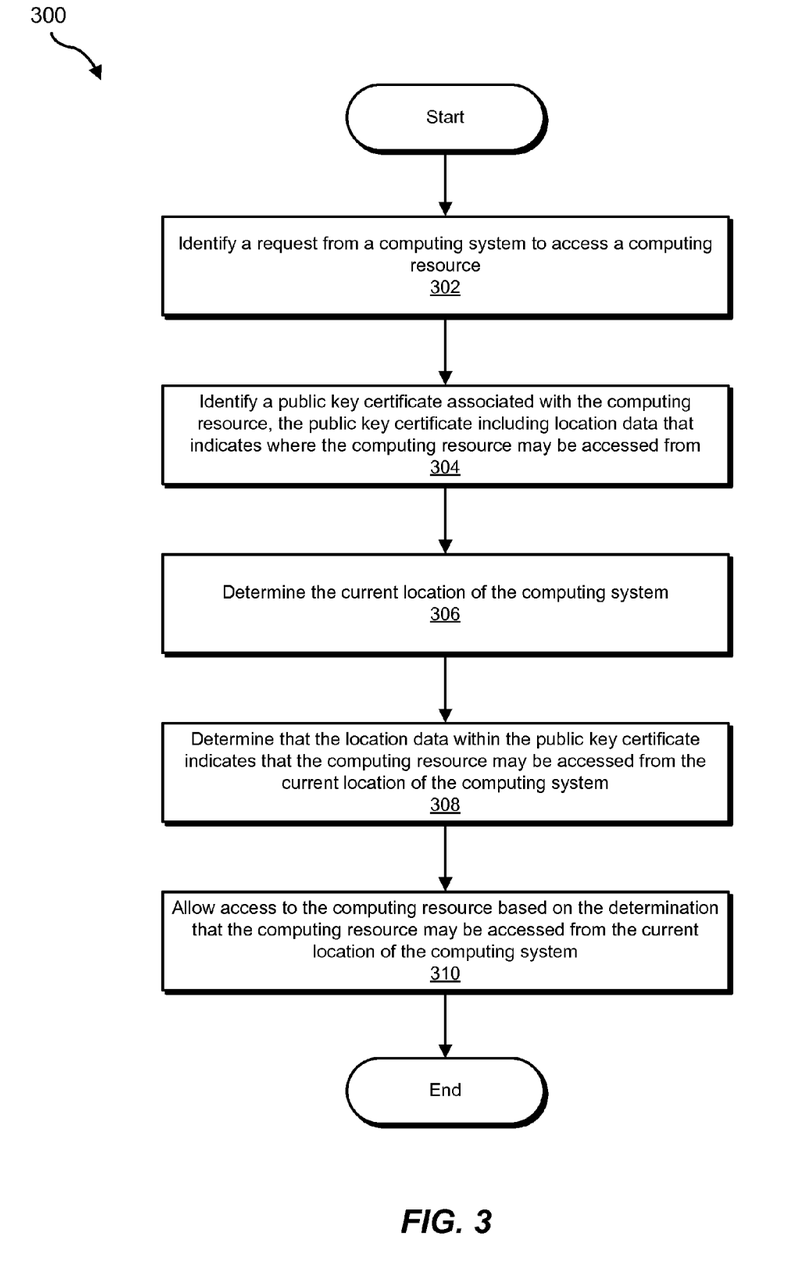
FIG. 3 is a flow diagram of an exemplary method for enforcing geolocation-based policies.

FIG. 3 is a flow diagram of an exemplary computer-implemented method 300 for enforcing geolocation-based policies. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a request from a computing system to access a computing resource. For example, identification module 104 may, as part of computing device 202 in FIG. 2, identify request 210 from computing device 202 to access computing resource 220.

As used herein, the phrase "computing resource" may refer to any resource that a computing system may access. Examples of computing resources include, without limitation, data, devices or other physical assets, services, and/or processes.

In some examples, the computing system originating the request may represent or include a mobile computing device. For example, the computing system may represent a cellular phone, a laptop, a tablet computing device, an e-book reader, etc.

The systems described herein may identify the request in step 302 in any of a variety of contexts. In one example, identification module 104 may identify the request upon intercepting the request. Additionally or alternatively, identification module 104 may identify the request upon intercepting a response to the request. In some examples, identification module 104 may operate as part of an authentication system, a content filtering system, a data loss prevention system, and/or a digital rights management system installed on the computing system.

At step 304, the systems described herein may identify a public key certificate associated with the computing resource that includes location data that indicates where the computing resource may be accessed from. For example, identification module 104 may, as part of computing device 202 in FIG. 2, identify public key certificate 230.

As used herein, the phrase "public key certificate" generally refers to any digital document and/or data created in such a way that the validity of its contents may be easily verified but which is difficult to tamper with. For example, a "public key certificate" may refer to a document that employs a digital signature scheme (e.g., asymmetric cryptography) to demonstrate the authenticity of the document. In some examples, a "public key certificate" may refer to a certificate of identity signed using such a scheme. For example, the public key certificate may include a public key certificate as defined by the X.509 standard.

In some examples, the public key certificate may have been issued specifically for the computing resource. Accordingly, the public key certificate may represent one of many public key certificates issued for various computing resources and including information for regulating access to these computing resources.

The public key certificate may include a variety of data. In some examples, as mentioned above, the public key certificate may include location data that specifies permissible locations where the computing resource may be accessed from. The location data may specify a location in any of a variety of ways. For example, the location data may specify geographic coordinates (i.e., longitude and latitude coordinates), one or more street addresses, a political entity (such as a city, a county, a province, a state, a state, and/or a country), geometrically defined boundaries, and/or any other information from which a location may be derived, looked up, and/or inferred (e.g., a telephone number, where the area code and/or prefix may be used to specify the location).

In addition to the examples listed above, the location data may also specify a distance and/or radius beyond the center and/or boundaries of a location. In some examples, the location data may specify a three-dimensional location (e.g., the location data may specify an elevation in addition to longitude and latitude). In some embodiments, the location data may specify more than one location.

In some examples, the location data within the public key certificate may specify differentiated levels of access for the various permissible locations from which the computing resource may be accessed. For example, and as will be described in greater detail below, the location data may specify that full access privileges to the computing resource may be granted for some locations (e.g., within the office building of an organization), but not others.

In some examples, identification module 104 may verify the integrity of the public key certificate to ensure that the location data contained within the same is valid. For example, the public key certificate may include a digital signature generated by encrypting a hash of data within the public key certificate (including the location data) with a private key. In this example, identification module 104 may take a hash of the data within the public key certificate and decrypt the digital signature with a public key corresponding to the private key. Identification module 104 may then compare the hash of the data within the public key with the decrypted digital signature. By determining that the hash and the decrypted digital signature are identical, identification module 104 may verify the integrity of the public key certificate. Accordingly, identification module 104 may ensure that the location data is valid (e.g., that the location data has not been tampered with following creation of the digital signature). In this manner, the systems and methods described herein may prevent a user from modifying location data used for a geolocation-based policy in order to circumvent the geolocation-based policy.

In some examples, the systems described herein may extract location data from the public key certificate. For example, identification module 104 may parse a public key certificate (such as public key certificate 230 in FIG. 2) in order to obtain exemplary location data 400 in FIG. 4.

Figure 4:
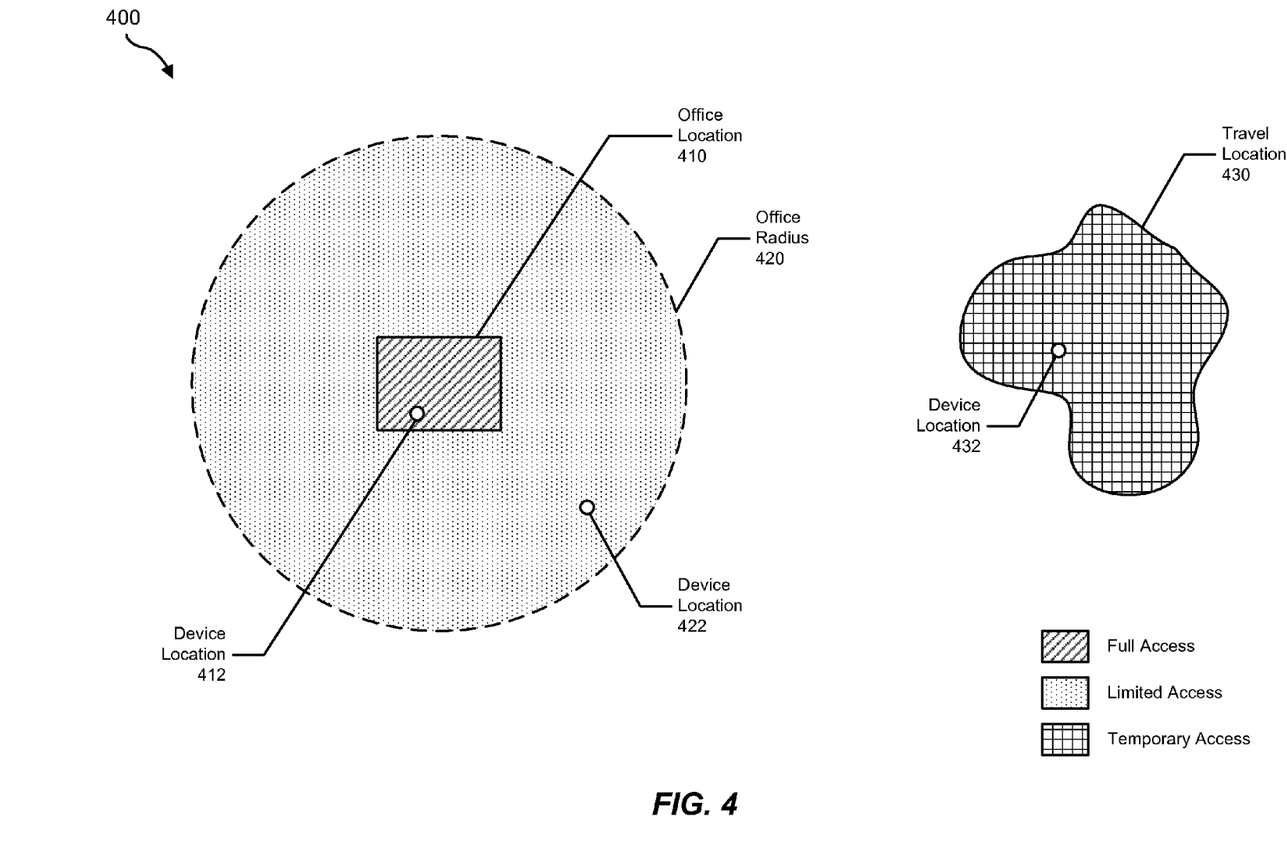
FIG. 4 is an illustration of exemplary location data for enforcing geolocation-based policies.

As shown in FIG. 4, location data 400 may include an office location 410, an office radius 420, and a travel location 430. In this example, office location 410 may be represented using a street address, a set of geographic coordinates, and/or any other information from which a location may be derived, looked up, and/or inferred. In addition, office radius 420 may be specified as a predetermined distance (e.g., one mile) from office location 410. Travel location 430 may be specified by a city (e.g., to include everything within the limits of the city).

In addition to location data, in some examples the public key certificate may also specify temporal data that indicates when the computing resource may be accessed. For example, the temporal data may specify a range of times when the computing resource may be accessed (e.g., during normal business hours only). In other examples, the temporal data may also specify differing levels of access for a computing resource based on various temporal characteristics. For example, the temporal data may specify that data may be read from, but not written to, a computing resource outside of normal business hours.

Returning to FIG. 3, at step 306 one or more of the systems described herein may determine the current location of the computing system. For example, location module 106 may, as part of computing device 202 in FIG. 2, determine the location 240 of computing device 202. Using FIG. 4 as an example, location module 106 may determine that computing device 202 is currently located at device location 412 in FIG. 4.

The systems described herein may determine the current location of the computing system in any suitable manner. For example, location module 106 may query a positioning device (such as a global positioning system device) within the computing system for the position of the computing system. Additionally or alternatively, location module 106 may retrieve the location from and/or calculate the location using a Wi-Fi triangulation technique, a mobile positioning technique (such as cellular signal triangulation and/or multilateration), and/or any other suitable method for locating and/or approximating the location of the computing system.

As mentioned earlier, in some examples the location data stored within the public key certificate may include three-dimensional location data. In this example, location module 106 may determine a three-dimensional location of the computing system. For example, location module 106 may determine the current longitude, latitude, and elevation of the computing system.

In addition, and as was also mentioned earlier, in some examples the public key certificate may also include temporal data. In these examples, location module 106 may also determine a current time. Location module 106 may determine the current time in any suitable manner. For example, location module 106 may query a system clock of the computing system. Additionally or alternatively, location module 106 may query a time server for the current time.

Returning to FIG. 3, at step 308 one or more of the systems described herein may determine that the location data within the public key certificate indicates that the computing resource may be accessed from the current location of the computing system. For example, determination module 108 may, as part of computing device 202 in FIG. 2, determine that location data 232 within public key certificate 230 indicates that computing resource 220 may be accessed from location 240.

Determination module 108 may perform step 308 in any suitable manner. In one example, determination module 108 may determine that the current location of the computing system falls at and/or within a permissible location identified by the location data stored within the public key certificate. Additionally or alternatively, determination module 108 may determine that the current location of the computing system falls near a permissible location identified by the location data stored within the public key certificate. Using FIG. 4 as an example, determination module 108 may determine that location data 400 indicates that the computing resource may be accessed from device location 412 by determining that device location 412 falls within the bounds of office location 410.

As mentioned earlier, in some examples the systems and methods described herein may identify temporal data within the public key certificate and identify a current time. In these examples, determination module 108 may also determine that the temporal data included within the public key certificate indicates that the computing resource may be accessed at the current time. For example, determination module 108 may determine that the current time falls within a permissible time range specified by the temporal data contained within the public key certificate.

In some examples, restrictions imposed by the temporal data may apply only to some locations specified within the location data. For example, the location data and temporal data within the public key certificate may indicate that the computing resource may be accessed at a certain location only over a certain time period. Using FIG. 4 as an example, location data 400 may indicate that the computing resource may be accessed from office location 410 at any time, but that the computing resource may only be accessed from travel location 430 for a specified period of time (e.g., for two weeks, during which an authorized user has scheduled a trip to travel location 430).

In one example, determination module 108 may populate a geolocation-based access policy with the location data contained within the public key certificate. In another example, determination module 108 may generate a geolocation-based access policy based at least in part on the location data contained within the public key certificate. Additionally or alternatively, determination module 108 may simply interpret the location data and/or data accompanying the location data stored within the public key certificate as a geolocation-based access policy. In each of the above examples, determination module 108 may perform step 308 by determining that the current location of the computing system satisfies the geolocation-based access policy.

Returning to FIG. 3, at step 310 one or more of the systems described herein may allow access to the computing resource based on the determination that the computing resource may be accessed from the current location of the computing device. For example, allowance module 110 may, as part of computing device 202 in FIG. 2, allow access to computing resource 220 upon determining that location data 232 within public key certificate 230 indicates that computing device 202 may access computing resource 220 at location 240.

Allowance module 110 may perform step 310 in any suitable manner. For example, if the request to access the computing resource was intercepted (e.g., by identification module 104), allowance module 110 may forward the request to the targeted computing resource. Additionally or alternatively, allowance module 110 may provide an authentication to the computing resource indicating that the request is valid.

As mentioned above, in some examples the systems described herein may, in addition to determining that the location data contained within the public key certificate indicates that the computing resource may be accessed from the current location of the computing device, determine that temporal data contained within the public key certificate indicates that the computing resource may be accessed at the current time. For example, allowance module 110 may allow access to the computing resource only if both the location data and the temporal data contained within the public key certificate indicate that the current location of the computing system and the current time, in combination, create permissible conditions for accessing the computing resource.

In some examples, the location data within the public key certificate may specify differentiated levels of access for the various permissible locations from which the computing resource may be accessed. For example, location data within public key certificate 230 may specify that full access privileges to the computing resource may be granted for some locations (e.g., within the office building of an organization), but not others. In this example, allowance module 110 may allow access to the computing resource in accordance with the level of access associated with the current location of the computing device.

For example, allowance module 110 may allow data to be read from any location within a specified country, but only allow data to be written to from within an office building. Using FIG. 4 as an example, if the computing system is within office location 410 (e.g., at device location 412), allowance module 110 may allow full access to the computing resource. However, if the computing system is within office radius 420 but outside office location 410 (e.g., at a device location 422), allowance module 110 may allow only partial access to the computing resource. Likewise, allowance module 110 may allow a differentiated level of access to the computing resource based on the current time (in accordance with the temporal data contained within the public key certificate) and/or based on a combination of the current location of the computing system, the current time, and/or other criteria (e.g., permissions of the requesting user, the nature of the request, etc.).

In some examples, allowance module 110 may further base the allowance of access to the computing resource on a content type specified in the request. For example, allowance module 110 may allow any request for stored emails within a broad set of locations, but may only allow a request for stored word processing documents within a narrower set of locations. Generally, allowance module 110 may use any combination of factors in addition to the current location of the computing system and the location data stored within the public key certificate to determine whether and to what extent to allow the request. Examples of such factors include, without limitation, temporal data, user permissions, the content type of the request, time passed since the last request, characteristics of the requesting device, and characteristics of the requesting application.

Upon completion of step 310 in FIG. 3, method 300 may terminate.

As explained above, by using location data embedded within public key certificates to enforce geolocation-based policies, the systems and methods described herein may control access to data or other computing resources (e.g., from mobile devices), while reducing the potential for tampering and/or circumvention of such geolocation-based policies. In addition, by verifying the integrity of such public key certificates, the systems and methods described herein may ensure that the location data contained within these public key certificates is valid and has not been tampered with.

Figure 5:
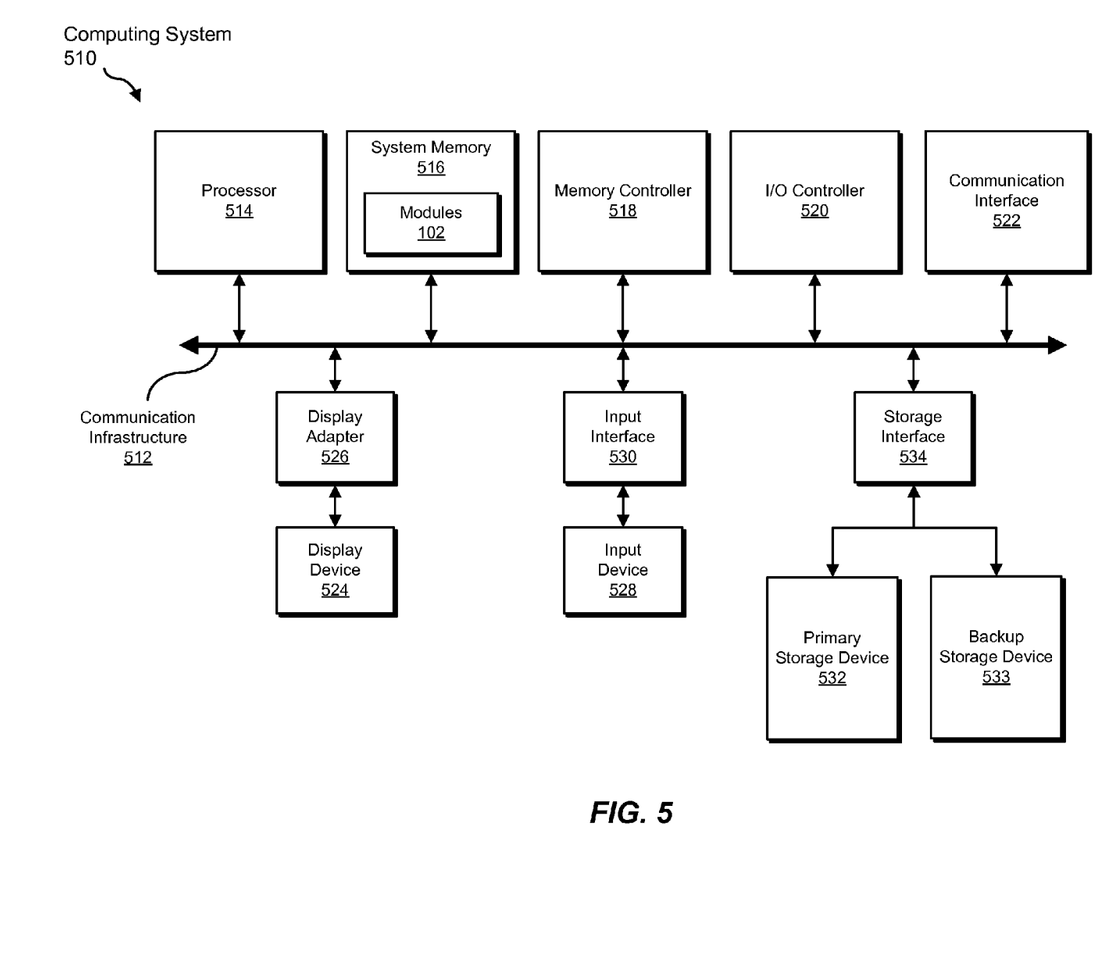
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 410 may perform and/or be a means for performing, either alone or in combination with other elements, one or more of the identifying, determining, allowing, and verifying steps described herein. All or a portion of computing system 410 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
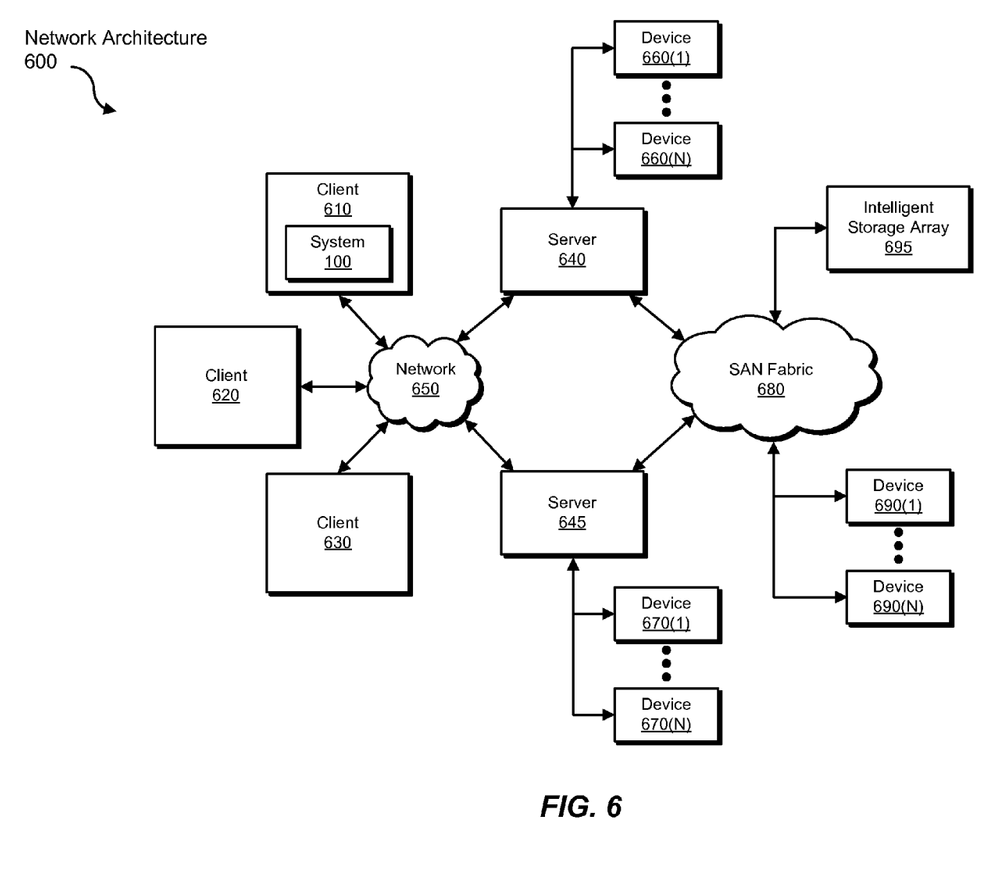
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, allowing, and verifying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for enforcing geolocation-based policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for enforcing geolocation-based policies.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enforcing geolocation-based policies, the method comprising:

identifying a request from a computing system to access a computing resource;

identifying a public key certificate, comprising a certificate of a public key, that is associated with the computing resource, the public key certificate including location data that indicates permissible locations from which the computing resource may be accessed;

determining a current location of the computing system;
determining that the location data within the public key certificate indicates that the computing resource may be accessed from the current location of the computing system;
allowing access to the computing resource based on the determination that the computing resource may be accessed from the current location of the computing system;
wherein at least a portion of the method is performed by a computing device comprising at least one processor.

2. The computer-implemented method of claim 1, wherein identifying the public key certificate comprises verifying the integrity of the public key certificate to ensure that the location data within the public key certificate is valid.

3. The computer-implemented method of claim 1, wherein the public key certificate further comprises temporal data that indicates when the computing resource may be accessed.

4. The computer-implemented method of claim 3, further comprising:
determining a current time;
determining that the temporal data indicates that the computing resource may be accessed at the current time;
wherein allowing access to the computing resource is further based on the determination that the temporal data indicates that the computing resource may be accessed at the current time.

5. The computer-implemented method of claim 1, wherein the location data within the public key certificate specifies a plurality of locations from which the computing resource may be accessed.

6. The computer-implemented method of claim 5, wherein:
the location data within the public key certificate specifies differentiated levels of access for the plurality of locations from which the computing resource may be accessed;
allowing access to the computing resource comprises allowing access to the computing resource in accordance with the differentiated level of access associated with the current location of the computing system.

7. The computer-implemented method of claim 1, wherein the computing system comprises a mobile computing device.

8. The computer-implemented method of claim 1, wherein:
the location data within the public key certificate comprises three-dimensional location data;
the current location of the computing system comprises a three-dimensional location of the computing system.

9. The computer-implemented method of claim 1, wherein identifying the public key certificate associated with the computing resource comprises identifying a public key certificate created to regulate access to the computing resource.

10. The computer-implemented method of claim 1, wherein allowing access to the computing resource further comprises allowing access to the computing resource based on a content type specified in the request.

11. A system for enforcing geolocation-based policies, the system comprising:
an identification module programmed to:
identify a request from a computing system to access a computing resource;
identify a public key certificate, comprising a certificate of a public key, that is associated with the computing resource, the public key certificate including location data that indicates permissible locations from which the computing resource may be accessed;
a location module programmed to determine a current location of the computing system;
a determination module programmed to determine that the location data within the public key certificate indicates that the computing resource may be accessed from the current location of the computing system;
an allowance module programmed to allow access to the computing resource based on the determination that the computing resource may be accessed from the current location of the computing system;
at least one hardware processor configured to execute the identification module, the location module, the determination module, and the allowance module.

12. The system of claim 11, wherein the identification module is programmed to identify the public key certificate by verifying the integrity of the public key certificate to ensure that the location data within the public key certificate is valid.

13. The system of claim 11, wherein the public key certificate further comprises temporal data that indicates when the computing resource may be accessed.

14. The system of claim 13, wherein:
the determination module is further programmed to:
determine a current time;
determine that the temporal data indicates that the computing resource may be accessed at the current time;
the allowance module is further programmed to allow access to the computing resource based on the determination that the temporal data indicates that the computing resource may be accessed at the current time.

15. The system of claim 11, wherein the location data within the public key certificate specifies a plurality of locations from which the computing resource may be accessed.

16. The system of claim 15, wherein:
the location data within the public key certificate specifies differentiated levels of access for the plurality of locations from which the computing resource may be accessed;
the allowance module is programmed to allow access to the computing resource in accordance with the differentiated level of access associated with the current location of the computing system.

17. The system of claim 11, wherein:
the location data within the public key certificate comprises three-dimensional location data;
the current location of the computing system comprises a three-dimensional location of the computing system.

18. The system of claim 11, wherein the identification module is programmed to identify the public key certificate associated with the computing resource by identifying a public key certificate created to regulate access to the computing resource.

19. The system of claim 11, wherein the allowance module is further programmed to allow access to the computing resource based on a content type specified in the request.

20. A non-transitory computer-readable-storage medium comprising one or more computer-executable instructions that, when executed by at least one processor of a computing device, cause the computing device to:
identify a request from a computing system to access a computing resource;
identify a public key certificate, comprising a certificate of a public key, that is associated with the computing resource, the public key certificate including location data that indicates permissible locations from which the computing resources may be accessed;
determine a current location of the computing system;

determine that the location data within the public key certificate indicates that the computing resource may be accessed from the current location of the computing system;

allow access to the computing resource based on the determination that the computing resource may be accessed from the current location of the computing system.

* * * * *